United States Patent [19]

Palmieri

[11] 4,238,639
[45] Dec. 9, 1980

[54] JOINT FOR LOW AND MEDIUM VOLTAGE ELECTRIC CABLES

[75] Inventor: Nicola Palmieri, Milan, Italy

[73] Assignee: Industrie Pirelli Societa per Azioni, Milan, Italy

[21] Appl. No.: 36,743

[22] Filed: May 7, 1979

[30] Foreign Application Priority Data

May 30, 1978 [IT] Italy ............... 23989 A/78

[51] Int. Cl.³ .................................... H02G 15/184
[52] U.S. Cl. .................. 174/73 R; 174/88 C
[58] Field of Search ............ 174/73 R, 73 SC, 84 R, 174/88 C

[56] References Cited

U.S. PATENT DOCUMENTS

| 2,967,899 | 1/1961 | Priaroggia | 174/73 R X |
|---|---|---|---|
| 3,127,291 | 3/1964 | Betz et al. | 174/84 R |
| 3,485,935 | 12/1969 | Kreuger | 174/73 R X |
| 3,622,682 | 11/1971 | Buroni | 174/73 R X |
| 3,691,291 | 9/1972 | Taj | 174/73 R |
| 3,932,933 | 1/1976 | Broad | 174/73 R X |
| 3,992,567 | 11/1976 | Mazia | 174/73 R |
| 4,006,288 | 2/1977 | Stevens | 174/73 R |
| 4,054,743 | 10/1977 | Mayer et al. | 174/73 R X |
| 4,159,860 | 7/1979 | Broad | 174/73 R X |

FOREIGN PATENT DOCUMENTS 644551 9/1962 Italy ............................ 174/84

Primary Examiner—Thomas J. Kozma
Assistant Examiner—E. Frederick Borchelt
Attorney, Agent, or Firm—Brooks, Haidt, Haffner & Delahunty

[57] ABSTRACT

A cable joint for joining the ends of two electric cables operating at voltages up to 60 kilovolts in which the bared conductor ends are conductively joined by a ferrule and the bared insulation of the two cables is at least partly covered by a pair of tight fitting elastomeric sleeves. The sleeves and the joined conductor ends are surrounded by a monolithic sleeve of dielectric material which tightly engages the elastomeric sleeves and which has a conductive, cylindrical electrode at its inner surface which surrounds at least the joined, bare conductors. Conductive rings on the conductors interconnect the conductors with the electrode. The monolithic sleeve is surrounded by a layer of semi-conductive material which interconnects the semi-conductive screens of the cables, and the semi-conductive layer may be surrounded by further layers for conductively interconnecting metal sheaths of the cables and for providing mechanical protection for the joint.

9 Claims, 3 Drawing Figures

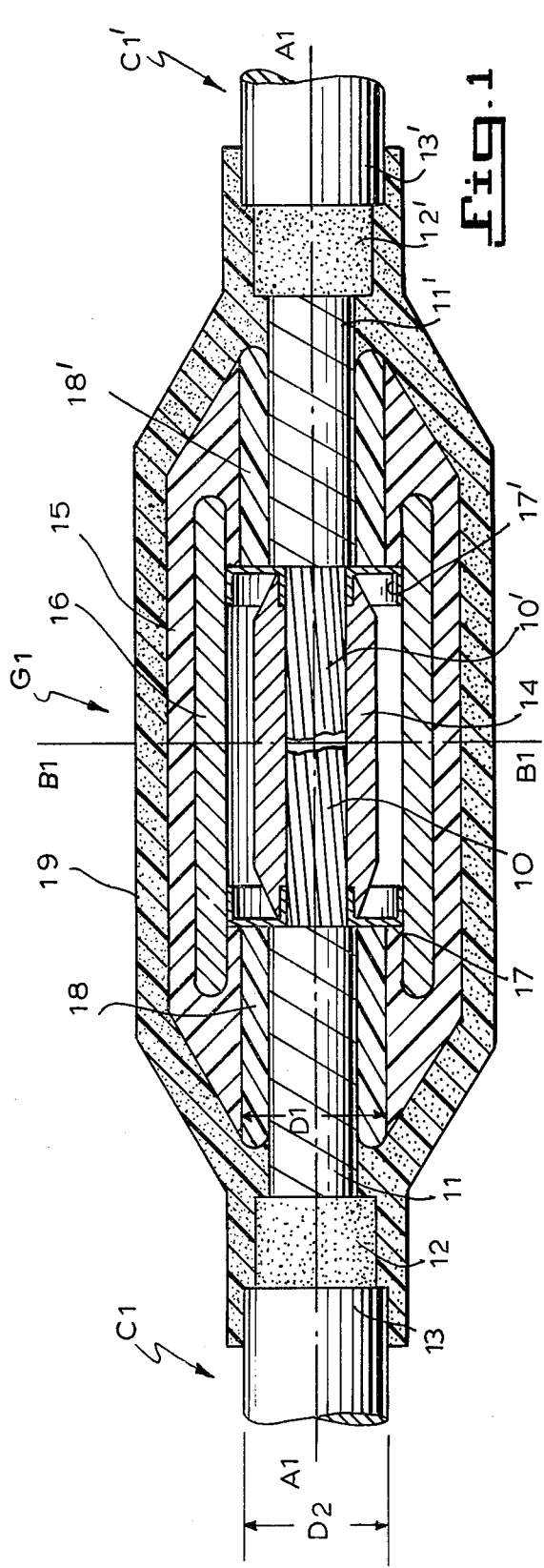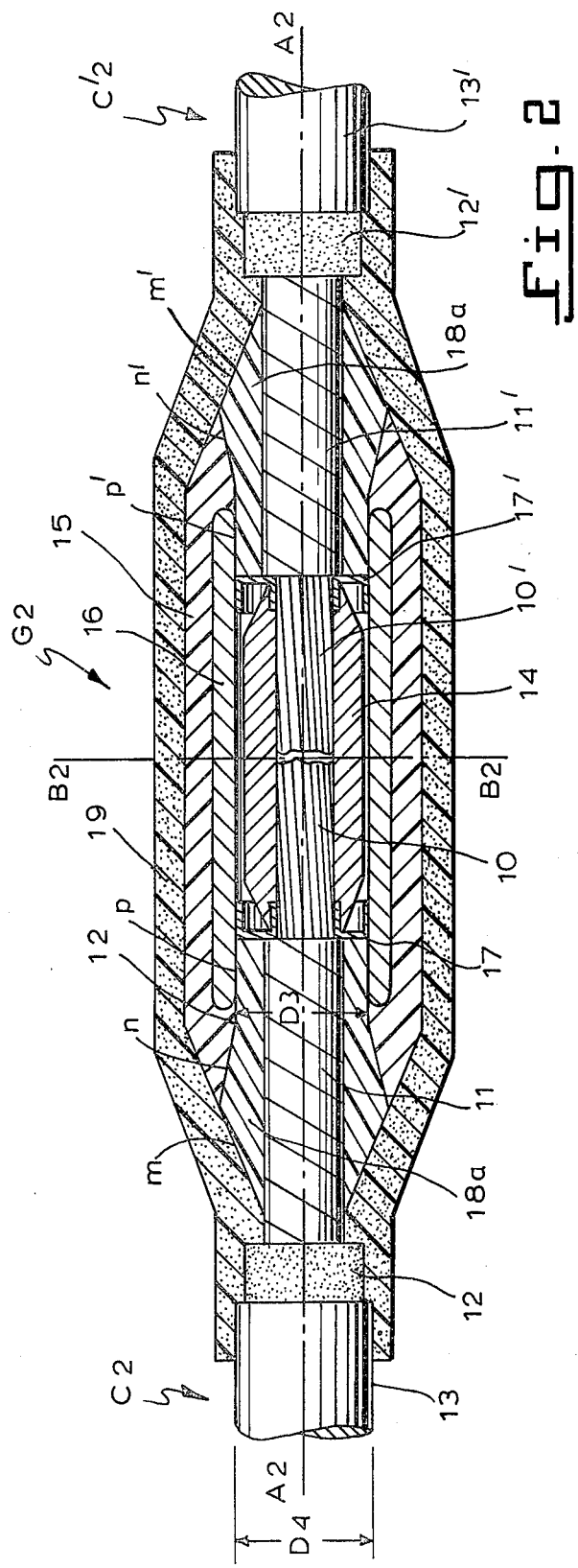

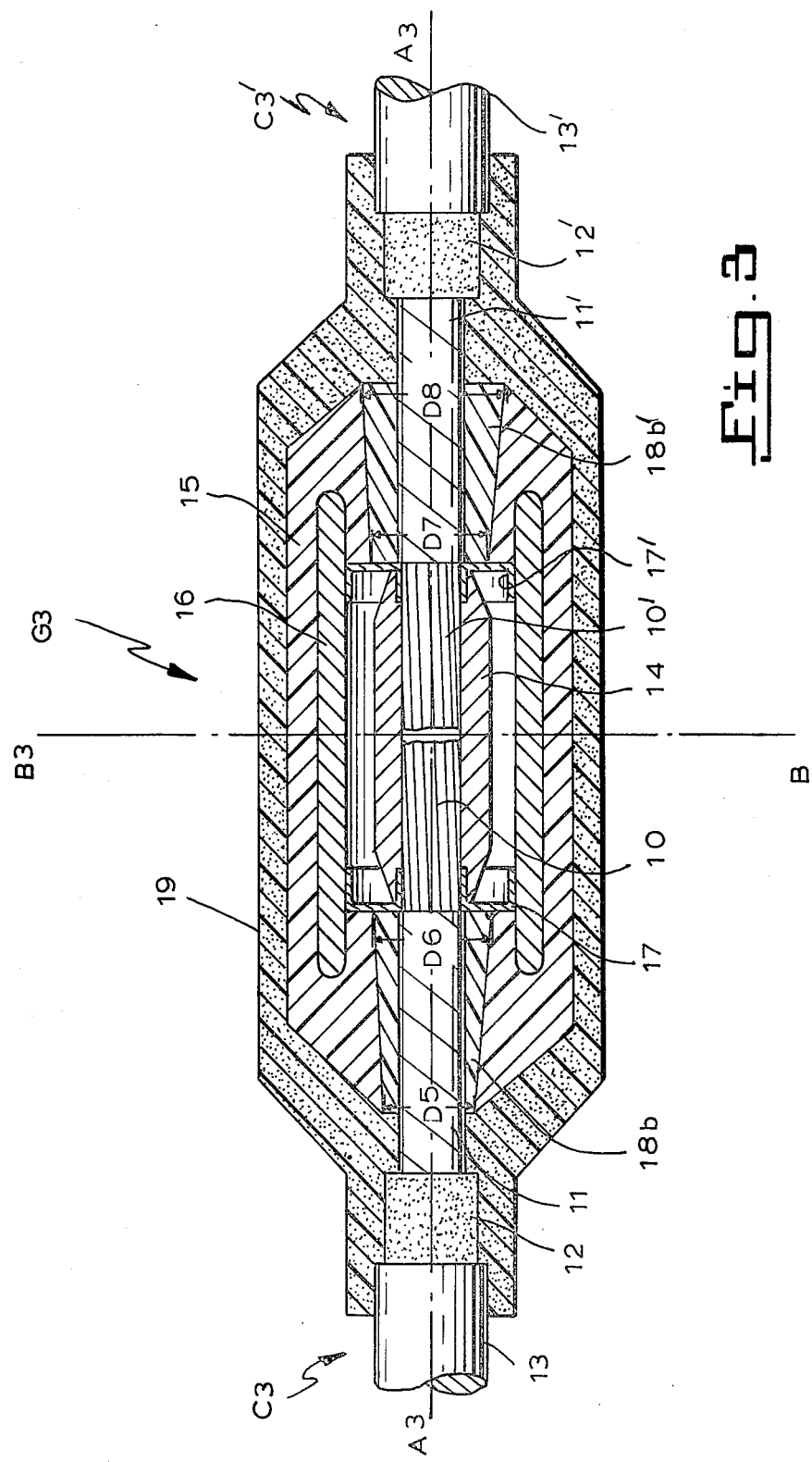

JOINT FOR LOW AND MEDIUM VOLTAGE ELECTRIC CABLES

The present invention relates to an improved joint for low and medium voltage electrical cables, i.e. cables for operation at up to 60 kilovolts. The invention relates particularly to a joint for inter-connecting unipolar or multipolar cable-heads (for low and medium voltages), the conductors of which are provided with either an impregnated paper insulation or with an insulation of extruded material, for example, a plastics or elastomeric material.

It is known in the art that the most painstaking and laborious operation, for obtaining a joint, is the reconstruction of the insulating layer after the conductors have been electrically joined, either by soldering or by suitable ferrules. Said operation is, in practice, carried out in various ways, which may be described, generally, as follows:

(1) Tapes of crepe paper, or of some other similar dielectric material are applied. This operation can be facilitated by tapering down to a point, the insulations of each conductor or else, by interposing a sheet of ruber or a plastics material and by having a semiconductive layer in contact with the joint and then, covering it with an insulating layer (so-called "pennant" type of binding).

(2) Pouring resinous materials (in a liquid or semisolid state) into a special container disposed around the conductors. The addition of polymerization initiators, at the pouring step, cause the polymerization of said materials with the formation of solid resin insulator. In the particular case of impregnated paper insulations, it also is part of the technique to utilize dielectric liquid materials which are chemically compatible with the impregnating material of the paper and which do not solidify with the passage of time.

(3) Employing elastic sleeves. Said sleeves can have sizes which require a forced mounting onto the cable core, or else, can be such as to provide an interspace that may be filled with various materials, particularly with suitable small cylinders, or with ring-adapters.

All of these described systems present, in different ways, quite a few drawbacks, such as, for example, some difficulty in completely eliminating the air from the zone surrounding the joint of the conductors, the considerable amount of time necessary for mounting, and the requirement of a substantial manual ability for carrying out the entire operation properly. On the other hand, an imperfect reconstruction of the insulation, and an incomplete elimination of the air from the joining zone would lead to considerably reducing the electrical reliability of the joint itself with respect to avoiding disruptive discharges.

A considerable technical progress has been achieved with the device described in U.S. Pat. No. 3,829,600 owned by the assignee of this application. Said device permits realizing economically, a joint offering a high reliability and is also quite simple to mount. Said joint comprises essentially, a dielectric, elastomeric sleeve disposed around and co-axial with the cableheads to be joined. On the inner wall of said sleeve, and restricted to the joining zone of the conductors, there is a stress-control electrode which is generally made of the same material as the sleeve, but which is rendered semiconductive by suitable substances. This stress-control electrode is in electrical contact with the conductors themselves.

Inside of the dielectric, elastomeric sleeve, there is disposed a second stress-control electrode which also generally is made of the same material as the sleeve and rendered semiconductive by suitable substances. The extremities of the second sleeve are in electrical contact with the metallic screens of the two cable-heads to be joined.

Said dielectric, elastomeric sleeve is, in its turn, enclosed in a metallic sleeve formed by a central section and two terminal sections assembled to the said central section by means of appropriate screws, the regulating of which permits variation of the total length of the metallic sleeve. In particular, the longitudinal contraction of the said metallic sleeve causes a radial compression on the dielectric, elastomeric sleeve, in such a manner as to cause its two extremities to adhere perfectly, to the two cable-head walls.

The joint which is described in said patent resolves, in a satisfactory manner, the main problems involved in joints utilized for low and medium voltage electric cables and particularly, for cables having extruded insulation.

However, further improvements with regard to an electrical reliability, the simplicity and rapidity of mounting, and the lower cost of the various constructing parts, always constitute important and progressive objectives for joint constructors. In this sense, the joint of the present invention actually constitutes an improvement with respect to the joints that are employed up to the present time. More particularly, the joint of the present invention presents, as compared to the joints usually utilized, the following technical advantages: a high guarantee that disruptive discharges will be avoided without requiring any complicated process for expelling the air from the joining zone, the possibility of joining differing types of cable-heads, which differ in the nature and the diameter of the conductor insulation, a great simplicity and rapidity of mounting and the possibility of employing a single, standard-type sleeve, for covering various types of cables.

Accordingly, one object of the present invention is an improved joint for use in connecting the corresponding conductors of unipolar, or multipolar, low and medium voltage cables insulated with a dielectric material, either of an elastomeric or plastics material or an impregnated paper, wherein a dielectric, monolithic sleeve surrounds at least part of the insulation of the cable-heads and the joint between the conductors, an electrically conductive means electrically connecting said joint with said stress-control electrode is on the inner surface of said sleeve and has a length such as to let it be disposed at least around said joint and at least one electrically conductive means electrically connecting said joint with said stress-control electrode. The improved joint is further characterized by the fact that, at the inner extremities of said dielectric monolithic sleeve, there are inserted a first and a second sleeve adapter, surrounding at least part of the insulation of the said first and second cable-heads in the proximity of the said joint, the adapters providing a seal with the sleeve, and having a longitudinal cavity dimensioned in such a way as to guarantee perfect contact with said insulation.

Other objects and advantages of the present invention will be apparent from the following detailed description of the presently preferred embodiments thereof, which description should be considered in conjunction with the accompanying drawings in which:

FIG. 1 is a longitudinal cross-section of one embodiment of the joint of the invention;

FIG. 2 is a longitudinal cross-section of a first preferred embodiment of the joint of the invention; and FIG. 3 is a longitudinal cross-section of another preferred embodiment of the joint of the invention.

With reference to FIG. 1, there can be seen a joint $G_1$ installed around the cable-heads $C_1$ and $C'_1$, aligned along the axis $A_1$-$A_1$. Each cable-head has been prepared for the joint by stripping tracts of proper lengths respectively, on the conductors 10 and 10', on the insulations 11 and 11' and on the conductive screens 12 and 12'. The covering for the cables $C_1$ and $C_1'$ is constituted by a metallic sheath (generally in lead) for each, designated by the numerals 13 and 13'. However, said sheath, 13 and 13' may be omitted whenever the cables have an extruded insulation.

A metal ferrule 14, ensures the electrical connection between the conductors 10 and 10'. Said ferrule 14, which in the illustrated case has the form of a hollow metallic cylinder, can be of any type in common use. Moreover, it can be placed in contact with the conductors by means of mechanical compression, soldering, or by any other suitable systems already known to technicians.

A dielectric, monolithic sleeve 15, preferably of epoxy resin but which may, be made also of any other suitable material, is disposed around the joined conductors 10 and 10', and at least partially around the lengths of the insulation 11 and 11' that have been exposed. The inner diameter $D_1$ of said sleeve 15, is larger than the outer diameter $D_2$ of the metallic sheaths 13 and 13' that cover the two cable-heads $C_1$ and $C'_1$.

Embedded in said sleeve 15, but projecting from its inner wall, is a stress-control electrode 16. Said stress-control electrode is formed like a hollow cylinder, out of metal, or some other electrically conductive material, the generatrix of which has a length which is at least equal to the total length of the joint of conductors 10 and 10', that is, has a length at least equal to the distance between the facing ends of the insulation 11 and 11'.

One, or several electrically conductive means, either identical to or different from each other, ensure an electrical connection between the ferrule 14 and the stress-control electrode 16. In the joint represented in FIG. 1, there are disposed two identical electrically conductive means, respectively 17 and 17', formed as flexible, elastic metal rings having inner and outer edges turned in the same direction with respect to the circumference of the ring itself. Each of the said rings 17 and 17' is applied on a corresponding exposed section of the conductors 10 and 10' in such a way that the inner edge is compressed between the conductor itself and the ferrule 14 and the outer edge is in contact with the inner surface of the stress-control electrode 16 extending from the inner wall of the sleeve 15.

Between the outer surface of the insulation 11 and 11' and the inner wall of the dielectric, monolithic sleeve 15, there are disposed a first and a second sleeve adapter 18 and 18'. Said first and second sleeve adapters are constituted by a dielectric, elastomeric material, preferably, silicone rubber. Referring to the sleeve adapter 18 at the cable-head $C_1$, the inner and the external diameters should be such as to ensure substantially perfect contact, during the assembly phase of the joint, respectively, between the surface of the insulation 11 with the inner wall of the sleeve adapter 18 and between the outer wall of the same sleeve adapter with the inner wall of the dielectric, monolithic sleeve 15. The same relationship must also be carried out for the sleeve adapter 18' relative to the cable-head $C'_1$, and in this way, air is excluded from between the adapters 18 and 18' and the insulation 11 and 11' and the sleeve 15.

Although in FIG. 1, there are shown a first and a second identical sleeve adapters, it is evident that whenever the two cable-heads do not present insulation with the same outer diameter, the joint will be provided with two sleeve adapters which are different from one another, but are such as to ensure the exclusion of, and a seal with respect to, air.

Over the dielectric, monolithic sleeve 15, there is disposed a conductive covering 19 which ensures the electrical continuity between the two exposed lengths of the semi-conductive screens 12 and 12', respectively, of the two cable-heads $C_1$ and $C'_1$. The said covering 19 which can, for example, be constituted by an elastomeric semiconductive layer, has the function of reconstructing the electrical screening that is interrupted by the joint.

If desired, or necessary, further known types of layers of various materials which have the function of ensuring an electrical continuity between the two metallic sheaths 13 and 13' and a mechanical reinforcement may be applied over the covering 19. None of these said layers is shown in FIG. 1, but the further layer may be a layer of lead joining the sheaths 13 and 13' or if the sheaths 13 and 13' are of another material, e.g. an insulating material, the further layer may be of a comparable insulating material.

The assembly of the joint of the invention, is carried out through the following successive steps:

(1) Each of the cable-heads $C_1$ and $C'_1$ is stripped of suitable lengths of the insulation 11 and 11' to expose the conductors 10 and 10' of the conductive screens 12 and 12' and of the sheaths 13 and 13';

(2) The dielectric, monolithic sleeve 15 is inserted over the cable-head $C_1$, and pushed along the metallic sheath 13 until it has at least gone beyond the pre-stripped lengths of the conductor 10 and of the insulation 11. The fitting of said dielectric, monolithic sleeve 15 onto the cable $C_1$ is made possible because its inner diameter $D_1$ is greater than the outer diameter $D_2$ of the metallic sheath 13;

(3) The first sleeve adapter 18 is pushed over the length of the insulation 11, and it is in the position shown in FIG. 1, and then, the electrically conductive means 17 is pushed over the exposed length of the conductor 10 until it is in the position shown in FIG. 1;

(4) The second sleeve adapter 18' is similarly applied on the exposed length of the insulation 11' of the cable-head $C'_1$, and then, a further second electrically conductive means 17', is similarly applied over the exposed length of the conductor 10';

(5) The electrical connection of the conductors 10 and 10', is then effectuated by means of the ferrule 14. In the illustrated embodiment, the inner edge of the electrically conductive means 17, is disposed between the conductor 10 and an extremity of the ferrule 14, and the inner edge of the further second electrically conductive means 17' is disposed between the conductor 10' and the other extremity of the ferrule 14;

(6) The dielectric, monolithic sleeve 15, is slid toward the cable-head $C'_1$ until its median transverse section plane $B_1$—$B_1$ coincides with the median-plane of the conductive joint between the conductors 10 and 10'. During this operation, the sleeve adapters 18 and 18' are compressed respectively against the insulation 11 and 11' in such a way as to have a substantially perfect contact between each of the insulations and the inner wall of each sleeve adapter and such that the same contact is also provided between the inner walls of the extremities of the said dielectric, monolithic sleeve with the outer walls of each of the sleeve adapters. The same operation of shifting the dielectric, monolithic sleeve 15, towards the cable-head $C'_1$, puts the outer edges of the electrically conductive means 17, and eventually 17', with the inner walls of the stress-control electrode 16 that extends from the inner wall of the dielectric, monolithic sleeve 15 itself. The conductive means 17 and 17', being flexible, permit such movement of the sleeve 15. The air eventually remaining in the zone of the joint, is not dangerous for electric security purposes since the air is in the zone screened-off by the stress-control electrode and the conductive means 17 and 17'.

(7) The semiconductive screen is reconstructed by means of a covering 19, consisting of a semiconductive elastomeric layer or of some other suitable material;

(8) The joint so formed, is eventually enclosed further, by other layers of various materials having the function of ensuring the electrical continuity between the metallic sheaths 13 and 13' and of the reinforcement of the joint. None of these further layers is shown in the drawing.

In FIG. 2, there is illustrated a first preferred embodiment of the joint of the present invention. Since the joint $G_2$, shown in FIG. 2, is substantially composed of the same parts as the joint $G_1$, shown in FIG. 1, the nomenclature and the numbering of the corresponding parts are identical in both these cases. In particular, the joint $G_2$, for the purpose of connecting the conductors of the cable-heads $C_2$ and $C'_2$, aligned along the axis $A_2$—$A_2$, includes a first and a second sleeve adapter 18a and 18a', one identical to the other. Each sleeve adapter has the shape of a first and a second truncated cone m, m' and n, n' joined at their greater bases and a cylinder p, p' joined at the lesser base of one of said truncated cones.

This configuration ensures a considerable stability for the entire joint against any accidental longitudinal shifting of the various component parts. The axial shiftings of the dielectric, monolithic sleeve 15, are, as a matter of fact, obstructed by the inclined surface of the truncated cone n and n' respectively, of the first and second sleeve adapters 18a and 18a'.

The assembly of the joint $G_2$ takes place in substantially the same way to that described for joint $G_1$ of FIG. 1. The inner diameter $D_3$ of the dielectric, monolithic sleeve 15 is greater than the outer diameter $D_4$ of the metallic cable sheath. However, should the greatest section of the said sleeve adapter 18a be quite large, or if the elastomeric material composing it be rather rigid, the inserting of the dielectric, monolithic sleeve 15 onto the sleeve adapter 18a could result in giving difficulties. In such a case, recourse can be taken to the following assembly variations.

First the sleeve adapter 18a is inserted onto the cable-head $C_2$. and then, the dielectric, monolithic sleeve 15 is applied over the end of the adapter 18a. The length of the insulation 11 is made sufficiently long to allow said dielectric, monolithic sleeve 15 to be pushed forward along the cable-head $C_2$ until the conductors 10 and 10' are accessible, e.g. until the right end of the sleeve 15 exposes the conductor 10. After having applied, as described in the preceding example, the second sleeve adapter 18a' and the electrically conductive means 17 and 17' and after joining the conductors 10 and 10' with the ferrule 14, the dielectric, monolithic sleeve 15 and the sleeve adapter 18a are pushed forward towards the cable-head $C'_2$.

In FIG. 3, there is illustrated a second preferred embodiment for the joint according to the present invention. Since the joint $G_3$, illustrated in FIG. 3, is substantially composed of the same parts as joint $G_1$, illustrated in FIG. 1, the nomenclatures and the numbering used for the corresponding parts are identical in both the cases. In particular, the joint $G_3$, for connecting the conductors of the cable-heads $C_3$ and $C'_3$ aligned along the axis $A_3$—$A_3$, includes a first, and a second sleeve adapter 18b and 18b' that are different from each other. Each of these sleeve adapters has the shape of a truncated cone. The outer diameters relative to the lesser and greater bases of each truncated cone are, respectively, $D_5$ and $D_6$ for the sleeve adapter 18b, and $D_7$ and $D_8$ for the sleeve adapter 18'd. Moreover, $D_6$ must be equal to or smaller than $D_7$.

The assembly of the joint $G_3$ is substantially the same as the assembling already described for the joint $G_1$ of FIG. 1. In fact, the dielectric, monolithic sleeve 15, has, at the two openings, different inner diameters, but the diameters are such that the lesser of these diameters is at least as great as the outer diameter of the metallic sheaths 13 and 13' of the two cable-heads $C_3$ and $C'_3$.

The main advantage of the joint according to this latter embodiment, consists in the fact that the inclination of the outer surface of the sleeve adapters permits, during the phase of assembling the joint, pushing forward, by force, the dielectric, monolithic sleeve 15, toward the cable-head $C'_3$, until it achieves, through the means of the sleeve adapters 18b and 18b', a very strong contact with the insulation lengths 11 and 11'.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An electric power cable joint interconnecting a pair of power cables, each of said cables having a bared conductor end portion and bared insulation surrounding the conductor and extending away from the conductor end and the end of one conductor being axially aligned with the end of the other conductor, said joint comprising:

means conductively interconnecting said end of one conductor to said end of the other conductor;

a pair of insulating, elastomeric adapter sleeves respectively tightly engaging and surrounding the insulation of one conductor and the insulation of the other conductor, each sleeve extending from adjacent a bared conductor in the direction away therefrom and at least one of said sleeves increasing in exterior size in a direction away from the conductor ends to provide a tapered exterior surface there on;

a monolithic, dielectric sleeve surrounding and tightly engaging at least part of each of said adapter sleeves including the tapered exterior surface of said one of said sleeves and surrounding both the conductor end portions and said means interconnecting the end of one conductor to the end of the other conductor, said monolithic sleeve having a conductive electrode which extends at least around the conductor end portions and which has an exposed inner surface and said monolithic sleeve having a size at a portion of its interior which is less than the maximum exterior size of said one of said sleeves whereby movement of said monolithic sleeve in said direction after it engages said one of said sleeves requires movement of said one of said sleeves in said direction; and conductive means conductively interconnecting the conductor ends and said electrode.

2. A joint as set forth in claim 1 wherein said conductive means comprises a pair of flexible rings, one said ring being secured to one conductor end portion adjacent the insulation therefor and the other said ring being secured to the other conductor end portion adjacent the insulation therefor and both said rings engaging said exposed surface of said electrode whereby the conductor end portions are completely surrounded by conductive means at the same potential as said ends.

3. A cable joint as set forth in claims 1 or 2 wherein said cables have sheaths and wherein the internal diameter of each of said adapter sleeves is less than the external diameter of the sheath of the cable on which it is mounted and the internal diameter of said monolithic sleeve is at least equal to the external diameter of at least one of said sheaths so that said monolithic sleeve can be slid over said one sheath.

4. A cable joint as set forth in claims 1 or 2 wherein said adapter sleeves have external surfaces having the shape of a truncated cone.

5. A cable joint as set forth in claim 4 wherein the external diameter of both said adapter sleeves increases in a direction away from the conductor ends and wherein the axial length of said monolithic sleeve relative to the axial length of the bared insulation on at least one of said cables is such that said monolithic sleeve and the adapter sleeve on the insulation of said last-mentioned one of said cables can be pushed along the last-mentioned insulation until the bared conductors of the cables are exposed.

6. A cable joint as set forth in claim 4 wherein the external diameter of one of said adapter sleeves increases in a direction away from the conductor ends and the external diameter of the other of said adapter sleeves decreases in a direction away from the conductor ends and the maximum diameter of said other adapter sleeve being no greater than the smallest diameter of said one adapter sleeve and wherein said monolithic sleeve has interior surfaces shaped to mate with the external surfaces of said adapter sleeves whereby movement of said monolithic sleeve in one axial direction presses said interior surfaces against the external surfaces of both said adapter sleeves.

7. A cable joint as set forth in claims 1 or 2 wherein said monolithic sleeve is rigid.

8. A cable joint as set forth in claim 7 wherein said monolithic sleeve is made of an epoxy resin.

9. A cable joint as set forth in claims 1 or 2 wherein said adapter sleeves are made of silicone rubber.

* * * * *